(12) United States Patent
Akamatsu et al.

(10) Patent No.: US 11,236,256 B2
(45) Date of Patent: Feb. 1, 2022

(54) DOUBLE-SIDED ADHESIVE SHEET, JOINED BODY COMPRISING DOUBLE-SIDED ADHESIVE SHEET, AND METHOD FOR JOINING/SEPARATING ADHERENDS

(71) Applicant: NITTO DENKO CORPORATION, Ibaraki (JP)

(72) Inventors: Kaori Akamatsu, Ibaraki (JP); Aya Nagatomo, Ibaraki (JP); Atsushi Takashima, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 124 days.

(21) Appl. No.: 15/768,794

(22) PCT Filed: Aug. 22, 2016

(86) PCT No.: PCT/JP2016/074337
§ 371 (c)(1),
(2) Date: Apr. 16, 2018

(87) PCT Pub. No.: WO2017/064925
PCT Pub. Date: Apr. 20, 2017

(65) Prior Publication Data
US 2018/0265750 A1    Sep. 20, 2018

(30) Foreign Application Priority Data
Oct. 16, 2015  (JP) .............................. JP2015-204997

(51) Int. Cl.
*C09J 9/02*  (2006.01)
*B32B 43/00*  (2006.01)
(Continued)

(52) U.S. Cl.
CPC .................................... *C09J 9/02* (2013.01);
*B32B 7/06* (2013.01); *B32B 7/12* (2013.01);
*B32B 27/00* (2013.01);
(Continued)

(58) Field of Classification Search
CPC ......... C09J 9/02; C09J 7/29; C09J 5/00; C09J 133/08; C09J 201/00; C09J 7/30;
(Continued)

(56) References Cited

U.S. PATENT DOCUMENTS 7,736,710 B2 * 6/2010 Sandberg ............. B65D 43/162
428/34.1
2001/0031367 A1 10/2001 Gilbert
(Continued)

FOREIGN PATENT DOCUMENTS

CN          1824722 A     8/2006
CN        101238191 A     8/2008
(Continued)

OTHER PUBLICATIONS

International Search Report for corresponding international application PCT/JP2016/074337 dated Nov. 22, 2016.
(Continued)

*Primary Examiner* — Cynthia L Schaller
(74) *Attorney, Agent, or Firm* — Hauptman Ham, LLP (57) ABSTRACT

A double-sided adhesive sheet has a laminate structure including a first adhesive layer containing an electrolyte, a second adhesive layer, and a conduction substrate. A double-sided adhesive sheet joined body includes, for example, an adhesive sheet having such a laminate structure, a first conductive adherend to which the first adhesive layer adheres, and a second adherend to which the second adhesive layer adheres. A method for joining/separating adherends includes joining first and second adherends to each other via the adhesive sheet, then applying a voltage to the first adhesive layer so as to generate a potential difference in a thickness direction of the first adhesive layer, and separating the first and second adherends from each other.

10 Claims, 5 Drawing Sheets

(51) Int. Cl.

| | | |
|---|---|---|
| *C09J 133/00* | (2006.01) | |
| *B32B 27/00* | (2006.01) | |
| *C09J 201/00* | (2006.01) | |
| *B32B 27/30* | (2006.01) | |
| *C09J 133/08* | (2006.01) | |
| *B32B 27/20* | (2006.01) | |
| *B32B 27/18* | (2006.01) | |
| *B32B 7/06* | (2019.01) | |
| *C09J 5/00* | (2006.01) | |
| *C09J 7/29* | (2018.01) | |
| *C09J 11/04* | (2006.01) | |
| *C09J 11/06* | (2006.01) | |
| *C09J 7/30* | (2018.01) | |
| *B32B 7/12* | (2006.01) | |
| *C08K 3/16* | (2006.01) | |
| *C08K 5/17* | (2006.01) | |
| *C08K 5/19* | (2006.01) | |

(52) U.S. Cl.
CPC ............. *B32B 27/18* (2013.01); *B32B 27/20* (2013.01); *B32B 27/30* (2013.01); *B32B 27/308* (2013.01); *B32B 43/006* (2013.01); *C09J 5/00* (2013.01); *C09J 7/29* (2018.01); *C09J 7/30* (2018.01); *C09J 11/04* (2013.01); *C09J 11/06* (2013.01); *C09J 133/00* (2013.01); *C09J 133/08* (2013.01); *C09J 201/00* (2013.01); *B32B 2250/03* (2013.01); *B32B 2250/04* (2013.01); *B32B 2250/05* (2013.01); *B32B 2250/24* (2013.01); *B32B 2250/246* (2013.01); *B32B 2307/202* (2013.01); *B32B 2307/748* (2013.01); *B32B 2405/00* (2013.01); *C08K 3/16* (2013.01); *C08K 5/17* (2013.01); *C08K 5/19* (2013.01); *C09J 2203/326* (2013.01); *C09J 2301/124* (2020.08); *C09J 2301/408* (2020.08); *C09J 2301/502* (2020.08); *C09J 2433/00* (2013.01)

(58) Field of Classification Search
CPC . C09J 11/06; C09J 11/04; C09J 133/00; C09J 2433/00; C09J 2203/326; C09J 2201/128; C09J 2205/302; C09J 2205/102; C09J 7/20; B32B 27/308; B32B 7/06; B32B 27/18; B32B 27/20; B32B 27/30; B32B 27/00; B32B 43/006; B32B 7/12; B32B 2250/24; B32B 2250/05; B32B 2405/00; B32B 2250/04; B32B 2307/748; B32B 2250/246; B32B 2250/03; B32B 2307/202; C08K 5/19; C08K 5/17; C08K 3/16

See application file for complete search history.

(56) References Cited

U.S. PATENT DOCUMENTS

| | | | |
|---|---|---|---|
| 2006/0188711 | A1 | 8/2006 | Kishioka et al. |
| 2007/0023382 | A1* | 2/2007 | Sandberg ........... B65D 21/0205 215/232 |
| 2007/0023929 | A1* | 2/2007 | Sandberg ............ B29C 65/3604 257/783 |
| 2009/0035580 | A1 | 2/2009 | Chino et al. |
| 2010/0000878 | A1 | 1/2010 | Gilbert |
| 2013/0004768 | A1 | 1/2013 | Yamagata et al. |
| 2013/0089769 | A1* | 4/2013 | Proctor .................. H01G 11/46 429/127 |
| 2016/0009961 | A1 | 1/2016 | Yamada et al. |
| 2016/0009962 | A1 | 1/2016 | Yamada et al. |

FOREIGN PATENT DOCUMENTS

| | | |
|---|---|---|
| CN | 102439107 A | 5/2012 |
| EP | 1693430 A2 | 8/2006 |
| EP | 2960313 A1 | 12/2015 |
| JP | 2000-273422 A | 10/2000 |
| JP | 2003-129030 A | 5/2003 |
| JP | 2003-193006 A | 7/2003 |
| JP | 2003-268325 A | 9/2003 |
| JP | 2009-260332 A | 11/2009 |
| JP | 2010-037355 A | 2/2010 |
| JP | 2011-202161 A | 10/2011 |
| JP | 2013-221093 A | 10/2013 |
| WO | 2007018239 A1 | 2/2007 |
| WO | 2014157408 A1 | 10/2014 |
| WO | 2015046433 A1 | 4/2015 |

OTHER PUBLICATIONS

The extended European search report for corresponding European application No. 16855179.4 dated Jun. 18, 2019.

Office Action issued for corresponding Japanese Patent Application No. 2017-545113 dated Jul. 7, 2020, along with an English translation.

Communication pursuant to Article 94(3) EPC issued for corresponding European Patent Application No. 16 855 179.4 dated Aug. 6, 2020.

Chinese Office Action dated Mar. 26, 2020, in connection with the Chinese Patent Application No. 201680060574.5.

Office Action issued for corresponding Chinese Patent Application No. 201680060574.5 dated Sep. 29, 2020, along with an English machine translation.

Office Action issued for corresponding Chinese Patent Application No. 201680060574.5 dated Apr. 27, 2021, along with an English machine translation.

Demand for Appeal issued for corresponding Japanese Patent Application No. 2017-545113 on Jun. 14, 2021, along with an English machine translation.

Decision of Refusal issued for corresponding Japanese Patent Application No. 2017-545113 dated Mar. 16, 2021, along with an English translation.

Office Action dated Aug. 16, 2021 for corresponding Chinese Patent Application No. 201680060574.5, along with an English translation.

* cited by examiner

DOUBLE-SIDED ADHESIVE SHEET, JOINED BODY COMPRISING DOUBLE-SIDED ADHESIVE SHEET, AND METHOD FOR JOINING/SEPARATING ADHERENDS

CROSS REFERENCE TO RELATED APPLICATIONS

This application claims the priority of Japanese Patent Application No. 2015-204997, filed on Oct. 16, 2015, in the Japanese Patent Office. Further, this application is the National Phase application of International Application No. PCT/JP2016/074337 filed on Aug. 22, 2016, which is incorporated herein by reference in its entirety.

TECHNICAL FIELD

The present invention relates to a technique for joining adherends to each other with a double-sided adhesive sheet and a technique for separating the adherends from each other.

BACKGROUND ART

In recent years, in various technical fields, a so-called double-sided adhesive sheet is used for joining members to each other. An adhesive layer of the double-sided adhesive sheet for joining members to each other is required to exhibit a certain adhesion force to a member as an adherend.

On the other hand, in manufacture of an electronic component or an electronic device, for example, there is a demand for a rework technology for improving yield and the like relating to parts or device to be manufactured or a recycling technology for disassembling parts or device once manufactured to collect the component parts. In order to respond to such a demand, for example, a double-sided adhesive sheet with a certain adhesion force and a certain peelability may be used for joining members to each other in a process of manufacturing an electronic component or an electronic device in some cases. The double-sided adhesive sheet with a certain peelability in order to enable rework or recycling are disclosed, for example, in PTLs 1 to 3 below.

CITATION LIST

Patent Literature

[PTL 1] JP-A-2000-273422
[PTL 2] JP-A-2003-193006
[PTL 3] JP-A-2003-268325

SUMMARY OF INVENTION

Technical Problem

When separating adherends joined by a double-sided adhesive sheet of the related art with an adhesion force and peelability from each other, there is a tendency that a peeling operation by bending and deforming the adherend is sufficiently performed with a smaller force than that of an operation of pulling both adherends in a direction in which both adherends are laminated via the adhesive sheet or a tensile shearing operation of both adherends in a surface spreading direction of the adhesive sheet. However, in a case where the adherends joined by the double-sided adhesive sheet to each other include a hard adherend (rigid member), a fragile adherend (fragile member), or an adherend easy to be plastically deformed (plastically deformable members), a separation between the adherends is difficult to be appropriately performed in the peeling operation. The rigid member as the adherend has a large flexural modulus and a bending deformation necessary for the adherend is less likely to occur in the peeling operation. The fragile member as the adherend is likely to be broken by an external force which acts on the adherend in order to cause the bending deformation of the adherend to occur during the peeling operation. The plastically deformable member as the adherend is likely to be plastically deformed by an external force which acts on the adherend in order to cause the bending deformation of the adherend to occur during the peeling operation.

Examples of the rigid members to be joined by a double-sided adhesive sheet include a silicon substrate for a semiconductor wafer application, a sapphire substrate, a SiC substrate, and a metal base substrate for an LED, a TFT substrate and a color filter substrate for a display, and a base substrate for an organic EL panel. Examples of the fragile member to be joined by the double-sided adhesive sheet include a semiconductor substrate such as a compound semiconductor substrate, a silicon substrate for MEMS device application, a passive matrix substrate, a surface cover glass for a smartphone, an one glass solution (OGS) substrate in which a touch panel sensor is attached to the cover glass, an organic substrate and an organic and inorganic hybrid substrate which are mainly composed of silsesquioxane or the like, a flexible glass substrate for a flexible display, and a graphene sheet.

The present invention has been made under the circumstances as described above, and an object thereof is to provide a double-sided adhesive sheet which is appropriate for efficiently performing a separation between adherends including at least one adherend which is difficult to be elastically bent and deformed after the adherends are joined to each other. Another object of the present invention is to provide a double-sided adhesive sheet joined body including such a double-sided adhesive sheet. In addition, still another object of the present invention is to provide a method for joining/separating adherends by using such a double-sided adhesive sheet.

Solution to Problem

According to a first aspect of the present invention, a double-sided adhesive sheet is provided. The double-sided adhesive sheet has a laminate structure including a first adhesive layer, a second adhesive layer, and a conduction substrate which is disposed between the first and second adhesive layers. The first adhesive layer contains an electrolyte. The first adhesive layer and the conduction substrate are electrically connected to each other.

In the double-sided adhesive sheet having the configuration, the first adhesive layer adheres to one adherend and second adhesive layer adheres to the other adherend, whereby two adherends can be joined to each other. Therefore, in a case where the adherend to which the first adhesive layer adheres has conductivity, a voltage can be applied to the first adhesive layer containing the electrolyte via the conductive adherend and the conduction substrate. When the voltage is applied in this manner, a potential difference in a thickness direction of the first adhesive layer is generated, and in the electrolyte in the adhesive layer, an orientation variation or movement in a layer thickness direction occurs. Therefore, a composition of a surface (electrically peelable adhesive face) of the adhesive layer changes. Accordingly, an adhesion force of the adhesive face with respect to the conductive adherend and/or the conduction substrate is lowered. Since the adhesion force of the first adhesive layer or adhesive face thereof tends to decrease as a voltage application time is longer, in a state where the adhesion force of the adhesive face with respect to the conductive adherend and/or conduction substrate is sufficiently lowered, there is no need to perform the peeling operation that causes the bending deformation of the adherend to occur when separating the adherends from each other. Even when one or both of the adherends joined by the double-sided adhesive sheet is the adherend which is difficult to be elastically bent and deformed, it is possible to separate the two adherends in which a joined state was realized by the double-sided adhesive sheet without requiring the peeling operation with respect to the adherends.

As described above, the double-sided adhesive sheet according to the first aspect of the present invention is appropriate for efficiently performing the separation between adherends including at least one adherend which is difficult to be elastically bent and deformed after the adherends are joined to each other. The double-sided adhesive sheet is, for example, appropriate for efficiently performing the separation between adherends including at least one rigid adherend after the adherends are joined to each other.

Preferably, the second adhesive layer contains an electrolyte to be electrically connected to the conduction substrate. According to this configuration, in a case where the adherend to which the second adhesive layer adheres has conductivity, a voltage can be applied to the second adhesive layer via the conductive adherend and the conduction substrate. When the voltage is applied in this manner, a potential difference in a thickness direction of the second adhesive layer is generated, and in the electrolyte in the adhesive layer, an orientation variation or movement in a layer thickness direction occurs. Therefore, a composition of a surface (electrically peelable adhesive face) of the adhesive layer changes. Accordingly, an adhesion force of the adhesive face with respect to the conductive adherend to which the second adhesive layer adheres and/or the conduction substrate is lowered. In a state where the adhesion force of the adhesive face with respect to the conductive adherend to which the second adhesive layer adheres and/or the conduction substrate is sufficiently lowered, there is no need to perform the peeling operation that causes the bending deformation of the adherend to occur when separating the adherends from each other. Even when one or both of the adherends joined by the double-sided adhesive sheet is the adherend which is difficult to be elastically bent and deformed, it is possible to separate the two adherends in which a joined state was realized by the double-sided adhesive sheet without requiring the peeling operation with respect to the adherend. In a case where both of two adherends which are joined to each other by the double-sided adhesive sheet having the configuration are conductive adherends, when separating the adherends from each other, a voltage can be applied to both the first and second adhesive layers.

Preferably, the conduction substrate includes an extension portion which is exposed with extending than the first adhesive layer and/or the second adhesive layer in a surface spreading direction of the conduction substrate. In this configuration, it is easy to realize an electrical connection between one terminal of a voltage applying device or a DC power supplying device and the conduction substrate, via the extension portion of the conduction substrate.

According to a second aspect of the present invention, a double-sided adhesive sheet is provided. The double-sided adhesive sheet has a laminate structure including a first adhesive layer, a second adhesive layer, a first conduction substrate and a second conduction substrate which are disposed between the first and second adhesive layers, and a third adhesive layer which is disposed between the first and second conduction substrates. The third adhesive layer contains an electrolyte. The third adhesive layer and the first conduction substrate are electrically connected to each other. The third adhesive layer and the second conduction substrates are electrically connected to each other.

In the double-sided adhesive sheet having the configuration, the first adhesive layer adheres to one adherend and second adhesive layer adheres to the other adherend, whereby two adherends can be joined to each other. Therefore, a voltage can be applied to the third adhesive layer containing an electrolyte via the first conduction substrate and the second conduction substrate. When the voltage is applied in this manner, a potential difference in a thickness direction of the third adhesive layer is generated, and in the electrolyte in the adhesive layer, an orientation variation or movement in a layer thickness direction occurs. Therefore, a composition of a surface (electrically peelable adhesive face) of the adhesive layer changes. Accordingly, an adhesion force of the adhesive face with respect to the first conduction substrate and/or the second conduction substrate is lowered. Since the adhesion force of the third adhesive layer or the adhesive face thereof tends to decrease as a voltage application time is longer, in a state where the adhesion force of the adhesive face with respect to the first conduction substrate and/or the second conduction substrate is sufficiently lowered, there is no need to perform the peeling operation that causes the bending deformation of the adherend to occur when separating the adherends from each other. Even when one or both of the adherends joined by the double-sided adhesive sheet is the adherend which is difficult to be elastically bent and deformed, it is possible to separate the two adherends in which a joined state was realized by the double-sided adhesive sheet without requiring the peeling operation with respect to the adherend.

As described above, the double-sided adhesive sheet according to the second aspect of the present invention is appropriate for efficiently performing the separation between adherends including at least one adherend which is difficult to be elastically bent and deformed after the adherends are joined to each other. The double-sided adhesive sheet is, for example, appropriate for efficiently performing the separation between adherends including at least one rigid adherend after the adherends are joined to each other.

Preferably, the first conduction substrate includes a first extension portion which is exposed with extending than the third adhesive layer in a first direction, and the second conduction substrate includes a second extension portion which is exposed with extending than the third adhesive layer in a second direction different from the first direction. In this configuration, it is easy to realize an electrical connection between one terminal of a voltage applying device or a DC power supplying device and the first conduction substrate, via the first extension portion and it is easy to realize an electrical connection between the other terminal and the second conduction substrate, via the second extension portion.

According to a third aspect of the present invention, a double-sided adhesive sheet joined body is provided. The joined body includes a first adherend having conductivity, a second adherend, and the double-sided adhesive sheet according to the first aspect that is interposed between the first and second adherends to join the adherends to each other. The double-sided adhesive sheet has a laminate structure including a first adhesive layer, a second adhesive layer, and a conduction substrate which is disposed between the first and second adhesive layers. The first adhesive layer of the double-sided adhesive sheet contains an electrolyte, is electrically connected to the conduction substrate, and adheres to the first adherend. The second adhesive layer adheres to the second adherend.

In the double-sided adhesive sheet joined body having the configuration, a voltage can be applied to the first adhesive layer in the double-sided adhesive sheet via the first adherend having conductivity and the conduction substrate of the double-sided adhesive sheet. When the voltage is applied in this manner, a potential difference in a thickness direction of the first adhesive layer is generated, and in the electrolyte in the adhesive layer, an orientation variation or movement in a layer thickness direction occurs. Therefore, a composition of a surface (electrically peelable adhesive face) of the adhesive layer changes. Accordingly, an adhesion force of the adhesive face with respect to the first adherend and/or the conduction substrate is lowered. Since the adhesion force of the first adhesive layer or the adhesive face thereof tends to decrease as a voltage application time is longer, in a state where the adhesion force of the adhesive face with respect to the first adherend and/or the conduction substrate is sufficiently lowered, there is no need to perform the peeling operation that causes the bending deformation of the adherends to occur when separating the first and second adherends from each other. Even when one or both of the first and second adherends is the adherend which is difficult to be elastically bent and deformed, it is possible to separate the first and second adherends in which a joined state was realized by the double-sided adhesive sheet without requiring the peeling operation with respect to the adherends.

As described above, the double-sided adhesive sheet joined body according to the third aspect of the present invention is appropriate for efficiently performing the separation between the adherends, even when the first adherend and/or the second adherend is the adherend which is difficult to be elastically bent and deformed. The double-sided adhesive sheet joined body is appropriate for efficiently performing the separation between the adherends even when the first adherend and/or the second adherend is, for example, a rigid adherend.

In the third aspect of the present invention, preferably, the second adhesive layer contains an electrolyte to be electrically connected to the conduction substrate, and the second adherend has conductivity. According to this configuration, a voltage can be applied to the second adhesive layer via the second adherend having conductivity and the conduction substrate. When the voltage is applied in this manner, a potential difference in a thickness direction of the second adhesive layer is generated, and in the electrolyte in the adhesive layer, an orientation variation or movement in a layer thickness direction occurs. Therefore, a composition of a surface (electrically peelable adhesive face) of the adhesive layer changes. Accordingly, an adhesion force of the adhesive face with respect to the second adherend to which the second adhesive layer adheres and/or the conduction substrate is lowered. In a state where the adhesion force of the adhesive face is sufficiently lowered, there is no need to perform the peeling operation that causes the bending deformation of the adherends to occur when separating the first and second adherends from each other. Even when one or both of the first and second adherends is the adherend which is difficult to be elastically bent and deformed, it is possible to separate the first and second adherends in which a joined state was realized by the double-sided adhesive sheet without requiring the peeling operation with respect to the adherends. In the present configuration, when separating the first and second adherends from each other, a voltage can be applied to both the first and second adhesive layers.

In the third aspect of the present invention, preferably, the conduction substrate includes an extension portion which is exposed with extending than the first adhesive layer and/or the second adhesive layer in a surface spreading direction of the conduction substrate. In this configuration, it is easy to realize an electrical connection between one terminal of a voltage applying device or a DC power supplying device and the conduction substrate, via the extension portion of the conduction substrate.

According to a fourth aspect of the present invention, a double-sided adhesive sheet joined body is provided. The joined body includes a first adherend, second adherend, and the double-sided adhesive sheet according to the second aspect that is interposed between the first and second adherends to join the adherends. The double-sided adhesive sheet has a laminate structure including a first adhesive layer, a second adhesive layer, and a first conduction substrate and a second conduction substrate which are disposed between the first and second adhesive layers, and a third adhesive layer which is disposed between the first and second conduction substrates. The first adhesive layer of the double-sided adhesive sheet adheres to the first adherend. The second adhesive layer adheres to the second adherend. The third adhesive layer contains an electrolyte, is electrically connected to the first conduction substrate, and is electrically connected to the second conduction substrate.

In the double-sided adhesive sheet joined body having the configuration, a voltage can be applied to the third adhesive layer in the double-sided adhesive sheet via the first and second conduction substrates. When the voltage is applied in this manner, a potential difference in a thickness direction of the third adhesive layer is generated, and in the electrolyte in the adhesive layer, an orientation variation or movement in a layer thickness direction occurs. Therefore, a composition of a surface (electrically peelable adhesive face) of the adhesive layer changes. Accordingly, an adhesion force of the adhesive face with respect to the first conduction substrate and/or the second conduction substrate is lowered. Since the adhesion force of the third adhesive layer or adhesive face thereof tends to decrease as a voltage application time is longer, in a state where the adhesion force is sufficiently lowered, there is no need to perform the peeling operation that causes the bending deformation of the adherends to occur when separating the first and second adherends from each other. Even when one or both of the first and second adherends is the adherend which is difficult to be elastically bent and deformed, it is possible to separate the first and second adherends in which a joined state was realized by the double-sided adhesive sheet without requiring the peeling operation with respect to the adherends.

As described above, the double-sided adhesive sheet joined body according to the fourth aspect of the present invention is appropriate for efficiently performing the separation between the adherends, even when the first adherend and/or the second adherend is the adherend which is difficult to be elastically bent and deformed. The double-sided adhesive sheet joined body is appropriate for efficiently performing the separation between the adherends even when the first adherend and/or the second adherend is, for example, a rigid adherend.

In the fourth aspect of the present invention, preferably, the first conduction substrate includes a first extension portion which is exposed with extending than the third adhesive layer in a first direction, and the second conduction substrate includes a second extension portion which is exposed with extending than the third adhesive layer in a second direction different from the first direction. In this configuration, it is easy to realize an electrical connection between one terminal of a voltage applying device or a DC power supplying device and the first conduction substrate, via the first extension portion and it is easy to realize an electrical connection between the other terminal and the second conduction substrate, via the second extension portion.

According to a fifth aspect of the present invention, a method for joining/separating adherends is provided. In the method, first, a first adherend and a second adherend are joined to each other via the double-sided adhesive sheet according to first or second aspect of the present invention. The obtained joined body is, for example, the double-sided adhesive sheet joined body according to the third or fourth aspect of the present invention. Then, when separating the first and second adherends from each other, a voltage is applied to the above-mentioned adhesive layer containing an electrolyte so as to generate a potential difference in a thickness direction of the adhesive layer.

In the present method, when the voltage is applied to the electrolyte-containing adhesive layer, a potential difference in a thickness direction of the adhesive layer is generated as described above, and in the electrolyte in the adhesive layer, an orientation variation or movement in a layer thickness direction occurs. Therefore, a composition of a surface (electrically peelable adhesive face) of the adhesive layer changes. Accordingly, an adhesion force of the adhesive face with respect to each element such as the adherend is lowered. Since the adhesion force of the electrolyte-containing adhesive layer or adhesive face thereof tends to decrease as a voltage application time is longer, in a state where the adhesion force of the adhesive face is sufficiently lowered, there is no need to perform the peeling operation that causes the bending deformation of the adherends to occur when separating the first and second adherends from each other. Even when one or both of the first and second adherends is the adherend which is difficult to be elastically bent and deformed, it is possible to separate the first and second adherends in which a joined state was realized by the double-sided adhesive sheet without requiring the peeling operation with respect to the adherends.

As described above, the method for joining/separating adherends according to the fifth aspect of the present invention is appropriate for suitably performing the separation between adherends including at least one adherend which is difficult to be elastically bent and deformed after the adherends are joined to each other. The present method is, for example, appropriate for suitably performing the separation between adherends including at least one rigid adherend after the adherends are joined to each other.

In the first to fifth aspects of the present invention, preferably, a thickness of the adhesive layer containing an electrolyte is 1 to 1000 μm. This configuration is preferable to reduce a voltage to be applied for separating the adherends from the adhesive layer having the electrolyte.

In the first to fifth aspects of the present invention, preferably, the electrolyte is an ionic liquid. The adhesive layer containing the ionic liquid preferably contains at least one selected from the group consisting of $(FSO_2)_2N^-$, $(CF_3SO_2)_2N^-$, $(CF_3CF_2SO_2)_2N^-$, $(CF_3SO_2)_3C^-$, $CH_3COO^-$, $CF_3COO^-$, $CF_3CF_2CF_2COO^-$, $CF_3SO_3^-$, $CF_3(CF_2)_3SO_3^-$, $Br^-$, $AlCl_4^-$, $Al_2Cl_7^-$, $NO_3^-$, $BF_4^-$, $PF_6^-$, $AsF_6^-$, $SbF_6^-$, and $F(HF)_n^-$, as an anion of the ionic liquid. The adhesive layer containing the ionic liquid preferably contains at least one selected from the group consisting of an imidazolium-based cation, a pyridinium-based cation, a pyrrolidinium-based cation, and an ammonium-based cation, as a cation of the ionic liquid. These configurations are preferable to realize high electric peelability in the adhesive sheet including the electrolyte-containing adhesive layer or ionic liquid-containing adhesive layer which is a voltage application target.

In the first to fifth aspects of the present invention, preferably, the adhesive layer containing the electrolyte contains an acrylic polymer. This configuration is preferable to realize a good adhesion force in the electrolyte-containing adhesive layer.

In the first to fifth aspects of the present invention, preferably, an electrolyte content in the adhesive layer containing the electrolyte is 0.5 to 30 parts by mass with respect to 100 parts by mass of the acrylic polymer. This configuration is preferable to realize high peelability during the voltage applying and a good adhesion force with good balance, in the electrolyte-containing adhesive layer.

DESCRIPTION OF EMBODIMENTS

Figure 1:
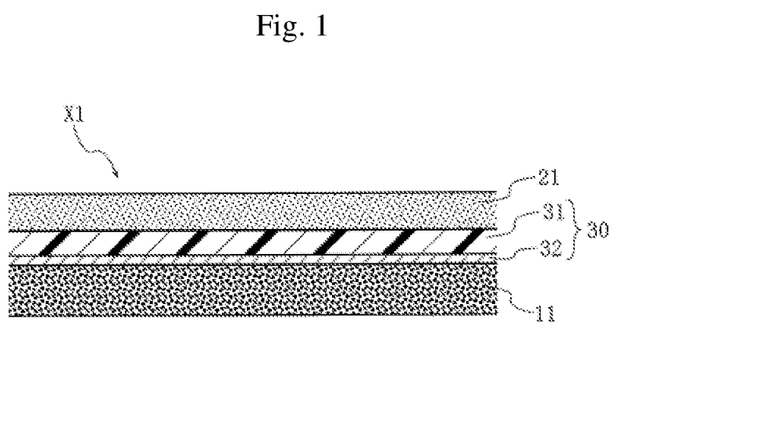
FIG. 1 is a sectional configuration view of a double-sided adhesive sheet according to an embodiment of the present invention.

FIG. 1 is a sectional configuration view of adhesive sheet X1 as a double-sided adhesive sheet according to an embodiment of the present invention. The adhesive sheet X1 is an electrically-peelable double-sided adhesive sheet and has a laminate structure including an adhesive layer 11, an adhesive layer 21, and a conduction substrate 30 therebetween.

The adhesive layer 11 is an electrically-peelable adhesive layer and contains a polymer as an adhesive and an electrolyte. In addition, the adhesive layer 11 forms one surface adhesive layer in the adhesive sheet X1.

Examples of the polymer contained in the adhesive layer 11 include an acrylic polymer, a rubber-based polymer, a vinyl alkyl ether-based polymer, a silicon-based polymer, a polyester-based polymer, a polyamide-based polymer, an urethane-based polymer, a fluorine-based polymer, and an epoxy-based polymer. In order to form the adhesive layer 11 of the present embodiment, one kind of polymer may be used and two or more kinds of polymers may also be used.

As the polymer contained in the adhesive layer 11, an acrylic polymer is preferable from a viewpoint of reducing a cost or realizing high productivity. The acrylic polymer is a polymer containing monomer units derived from alkyl acrylate and/or alkyl methacrylate as the main monomer units having the largest mass ratio. Hereinafter, "(meth) acrylic" represents "acrylic" and/or "methacrylic".

In a case where the adhesive layer 11 contains the acrylic polymer, the acrylic polymer preferably has a monomer unit derived from alkyl (meth)acrylate having an alkyl group having 1 to 14 carbon atoms. Examples of the (meth)acrylic acid alkyl ester include methyl (meth)acrylate, ethyl (meth) acrylate, propyl (meth)acrylate, isopropyl (meth)acrylate, n-butyl (meth)acrylate, sec-butyl (meth)acrylate, 1,3-dimethylbutyl acrylate, pentyl (meth)acrylate, isopentyl (meth) acrylate, hexyl (meth)acrylate, 2-ethyl butyl (meth)acrylate, heptyl (meth)acrylate, n-octyl (meth)acrylate, isooctyl (meth)acrylate, 2-ethylhexyl (meth)acrylate, n-nonyl (meth) acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate. Among these, n-butyl (meth)acrylate, sec-butyl (meth)acrylate, n-octyl (meth)acrylate, isooctyl (meth)acrylate, 2-ethylhexyl (meth)acrylate, n-nonyl (meth)acrylate, and isononyl (meth)acrylate are preferable. In order to form the acrylic polymer in the adhesive layer 11, one kind of alkyl (meth)acrylate may be used and two or more kinds of alkyl (meth)acrylate may also be used.

In the acrylic polymer, a proportion of the monomer unit derived from alkyl (meth)acrylate having an alkyl group having 1 to 14 carbon atoms is, from the viewpoint of realizing the high adhesion force in the adhesive layer 11, preferably 50% by mass or more, more preferably 60% by mass or more, still more preferably 70% by mass or more, and still further preferably 80% by mass or more. That is, in a total amount of raw material monomer to form the acrylic polymer, a proportion of the alkyl (meth)acrylate having an alkyl group having 1 to 14 carbon atoms is, from the viewpoint of realizing the high adhesion force in the adhesive layer 11, preferably 50% by mass or more, preferably 50% by mass or more, more preferably 60% by mass or more, still more preferably 70% by mass or more, and still further preferably 80% by mass or more.

In a case where the adhesive layer 11 contains the acrylic polymer, the acrylic polymer preferably contains a monomer unit derived from a polar group-containing monomer, from the viewpoint of realizing a high adhesion force in the adhesive layer 11. Examples of the polar group-containing monomer include a carboxyl group-containing monomer, a hydroxyl group-containing monomer, and a vinyl group-containing monomer.

Examples of the carboxyl group-containing monomer include acrylic acid, methacrylic acid, itaconic acid, maleic acid, fumaric acid, crotonic acid, isocrotonic acid, carboxyethyl (meth)acrylate, and carboxypentyl (meth)acrylate. Among these, acrylic acid and methacrylic acid are preferable. In order to form the acrylic polymer in the adhesive layer 11, one kind of carboxyl group-containing monomer may be used, and two or more kinds of carboxyl group-containing monomers may be used.

Examples of the hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate, (4-hydroxymethyl cyclohexyl) methyl acrylate, N-methylol (meth)acrylamide, vinyl alcohol, allyl alcohol, 2-hydroxyethyl vinyl ether, 4-hydroxybutyl vinyl ether, and diethylene glycol monovinyl ether. Among these, 2-hydroxyethyl (meth)acrylate is preferable. In order to form the acrylic polymer in the adhesive layer 11, one kind of hydroxyl group-containing monomer may be used and two or more kinds of hydroxyl group-containing monomers may be used.

Examples of the vinyl group-containing monomer include vinyl acetate, vinyl propionate, and vinyl laurate. Among these, vinyl acetate is preferable. In order to form the acrylic polymer in the adhesive layer 11, one kind of vinyl group-containing monomer may be used and two or more kinds of vinyl group-containing monomers may be used.

In the acrylic polymer, a proportion of the monomer unit derived from the polar group-containing monomer is preferably 0.1% by mass or more, from the viewpoint that a cohesive force in the adhesive layer 11 is secured to prevent adhesive residue from remaining on the surface of the adherend after peeling of the adhesive layer 11. That is, a proportion of the polar group-containing monomer in the total amount of a raw material monomers for forming the acrylic polymer is preferably 0.1% by mass or more, from the viewpoint of securing the cohesive force and preventing the adhesive residue from remaining. In addition, in the acrylic polymer, a proportion of the monomer unit derived from the polar group-containing monomer is preferably 30% by mass or less, from the viewpoint of appropriately exhibiting a characteristic attributable to the monomer unit derived from the alkyl (meth)acrylate having an alkyl group having 1 to 14 carbon atoms in the acrylic polymer. That is, a proportion of the polar group-containing monomer in the total amount of the raw material monomers for forming the acrylic polymer is preferably 30% by mass or less from the viewpoint of exhibiting the characteristic.

The acrylic polymer as described above can be obtained by polymerizing the monomers described above. Examples of a polymerization method include solution polymerization, emulsion polymerization, bulk polymerization, and suspension polymerization.

A content of the polymer in the adhesive layer 11 is preferably 70% by mass or more, more preferably 80% by mass or more, still more preferably 85% by mass or more, and still further preferably 90% by mass or more, from a viewpoint of realizing a sufficient adhesion force in the adhesive layer 11.

The electrolyte contained in the adhesive layer 11 is a substance that is ionizable to anions and cations, and examples of such electrolytes include an ionic liquid, an alkali metal salt, and an alkaline earth metal salt. From the viewpoint of realizing good electric peelability in the adhesive layer 11, as the electrolyte contained in the adhesive layer 11, an ionic liquid is preferable. The ionic liquid is a salt in a liquid state at a room temperature (approximately 25° C.) and includes anions and cations.

In a case where the adhesive layer 11 contains an ionic liquid, examples of an anion of the ionic liquid preferably include at least one selected from the group consisting of $(FSO_2)_2N^-$, $(CF_3SO_2)_2N^-$, $(CF_3CF_2SO_2)_2N^-$, $(CF_3$ $SO_2)_3C^-$, $Br^-$, $AlCl_4^-$, $Al_2Cl_7^-$, $NO_3^-$, $BF_4^-$, $PF_6^-$, $CH_3COO^-$, $CF_3COO^-$, $CF_3CF_2CF_2COO^-$, $CF_3SO_3^-$, $CF_3(CF_2)_3SO_3^-$, $AsF_6^-$, $SbF_6^-$, and $F(HF)_n^-$.

In a case where the adhesive layer 11 contains an ionic liquid, examples of a cation of the ionic liquid preferably include at least one selected from the group consisting of an imidazolium-based cation, a pyridinium-based cation, a pyrrolidinium-based cation, and an ammonium-based cation.

Examples of the imidazolium-based cation include a 1-methylimidazolium cation, a 1-ethyl-3-methylimidazolium cation, a 1-propyl-3-methylimidazolium cation, a 1-butyl-3-methylimidazolium cation, a 1-pentyl-3-methylimidazolium cation, a 1-hexyl-3-methylimidazolium cation, a 1-heptyl-3-methylimidazolium cation, a 1-octyl-3-methylimidazolium cation, a 1-nonyl-3-methylimidazolium cation, a 1-undecyl-3-methylimidazolium cation, a 1-dodecyl-3-methylimidazolium cation, a 1-tridecyl-3-methylimidazolium cation, a 1-tetradecyl-3-methylimidazolium cation, a 1-pentadecyl-3-methylimidazolium cation, a 1-hexadecyl-3-methylimidazolium cation, a 1-heptadecyl-3-methylimidazolium cation, a 1-octadecyl-3-methylimidazolium cation, a 1-undecyl-3-methylimidazolium cation, a 1-benzyl-3-methylimidazolium cation, a 1-butyl-2,3-dimethylimidazolium cation, and a 1,3-bis (dodecyl) imidazolium cation.

Examples of the pyridinium-based cation include a 1-butyl pyridinium cation, a 1-hexyl pyridinium cation, a 1-butyl-3-methylpyridinium cation, a 1-butyl-4-methylpyridinium cation, and a 1-octyl-4-methylpyridinium cation.

Examples of the pyrrolidinium-based cation include a 1-ethyl-1-methylpyrrolidinium cation and a 1-butyl-1-methylpyrrolidinium cation.

Examples of the ammonium-based cation include a tetraethylammonium cation, a tetrabutylammonium cation, a methyl trioctyl ammonium cation, a tetradecyl hexyl ammonium cation, a glycidyl trimethyl ammonium cation, and a trimethylaminoethyl acrylate cation.

As the ionic liquid in the adhesive layer 11, from the viewpoint that high diffusibility of cation is used to realize high electric peelability in the adhesive layer 11, an ionic liquid containing the above described $(FSO_2)_2N^-$ [bis(fluorosulfonyl)imide anion] and a cation having a molecular weight of 160 or less is particularly preferable. Examples of the cation having a molecular weight of 160 or less include a 1-methylimidazolium cation, a 1-ethyl-3-methylimidazolium cation, a 1-propyl-3-methylimidazolium cation, a 1-butyl-3-methylimidazolium cation, a 1-pentyl-3-methylimidazolium cation, a 1-butyl pyridinium cation, a 1-hexyl pyridinium cation, a 1-butyl-3-methylpyridinium cation, a 1-butyl-4-methylpyridinium cation, a 1-ethyl-1-methylpyrrolidinium cation, a 1-butyl-1-methylpyrrolidinium cation, a tetraethylammonium cation, a glycidyl trimethyl ammonium cation, and a trimethylaminoethyl acrylate cation.

Examples of commercially available ionic liquids contained in the adhesive layer 11 include "ELEXCEL AS-110", "ELEXCEL MP-442", "ELEXCEL IL-210", "ELEXCEL MP-471", "ELEXCEL MP-456", and "ELEXCEL AS-804" manufactured by DKS Co. Ltd.

Examples of an alkali metal salt include $LiCl$, $Li_2SO_4$, $LiBF_4$, $LiPF_6$, $LiClO_4$, $LiAsF_6$, $LiCF_3SO_3$, $LiN(SO_2CF_3)_2$, $LiN(SO_2C_2F_5)_2$, $LiC(SO_2CF_3)_3$, $NaCl$, $Na_2SO_4$, $NaBF_4$, $NaPF_6$, $NaClO_4$, $NaAsF_6$, $NaCF_3SO_3$, $NaN(SO_2CF_3)_2$, $NaN(SO_2C_2F_5)_2$, $NaC(SO_2CF_3)_3$, $KCl$, $K_2SO_4$, $KBF_4$, $KPF_6$, $KClO_4$, $KAsF_6$, $KCF_3SO_3$, $KN(SO_2CF_3)_2$, $KN(SO_2C_2F_5)_2$, and $KC(SO_2CF_3)_3$.

The content of the ionic liquid in the adhesive layer 11 is, for example, 0.1% by mass or more for imparting the electric peelability in the adhesive layer 11. From the viewpoint of realizing good electric peelability in the adhesive layer 11, the content of the ionic liquid in the adhesive layer 11 is preferably 0.5 parts by mass or more, more preferably 0.6 parts by mass or more, still more preferably 0.8 parts by mass or more, still further preferably 1.0 part by mass or more, and still further preferably 1.5 parts by mass or more, with respect to 100 parts by mass of the polymer in the adhesive layer 11. From the viewpoint of realizing a good adhesion force and electric peelability with good balance in the adhesive layer 11, the content of the ionic liquid in the adhesive layer 11 is preferably 30 parts by mass or less, more preferably 20 parts by mass or less, still more preferably 15 parts by mass or less, still further preferably 10 parts by mass or less, and still further preferably 5 parts by mass or less, with respect to 100 parts by mass of the polymer in the adhesive layer 11.

The adhesive layer 11 may contain other components within a range of not impairing an effect of the present invention. Examples of such components include a tackifier, a silane coupling agent, a colorant, a pigment, a dye, a surface lubricant, a leveling agent, a softener, an antioxidant, an anti-aging agent, a photostabilizer, a polymerization inhibitor, an inorganic or organic filler, metal powder, particulates, and foil. The content of these components is determined according to a purpose of use and is, for example, 10 parts by mass or less with respect to 100 parts by mass of the polymer within a range of not impairing the effect of the present invention.

A thickness of the adhesive layer 11 of the adhesive sheet X1 is preferably 1 to 1000 μm from the viewpoint of realizing good adhesiveness in the adhesive layer 11 or the viewpoint of reducing the applied voltage for separating adherends from each other in the adhesive layer 11 as the electrolyte-containing adhesive layer. The lower limit of the thickness of the adhesive layer 11 is more preferably 3 μm, still more preferably 5 μm, and still further preferably 8 μm. The upper limit of the thickness of the adhesive layer 11 is more preferably 500 μm, still more preferably 100 μm, and still further preferably 30 μm.

The adhesive layer 21 contains a polymer for exhibiting adhesiveness in the adhesive layer 21. In addition, the adhesive layer 21 forms an adhesive layer on one surface in the adhesive sheet X1. The components contained in the adhesive layer 21 and the contents thereof are the same as those described above for the components contained in the adhesive layer 11 and the contents thereof, except for the electrolyte. A thickness of the adhesive layer 21 is preferably 1 to 2000 μm, from the viewpoint of realizing good adhesiveness in the adhesive layer 21. The lower limit of the thickness of the adhesive layer 21 is more preferably 3 μm, still more preferably 5 μm, and still further preferably 8 μm. The upper limit of the thickness of the adhesive layer 21 is more preferably 1000 μm, still more preferably 500 μm, and still further preferably 100 μm.

Figure 2:
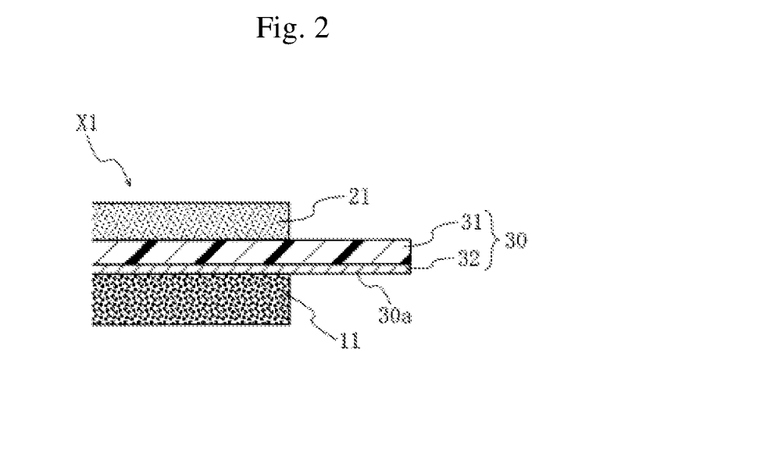
FIG. 2 is a sectional view illustrating an example of an end portion of the double-sided adhesive sheet shown in FIG. 1.

In this embodiment, the conduction substrate 30 has a laminate structure including a substrate 31 and a conductive layer 32. The substrate 31 is a portion that functions as a support, and is, for example, a plastic substrate, a fiber based substrate, or a paper based substrate. The conductive layer 32 is a layer having conductivity, and is formed of, for example, metal or a conductive polymer. A thickness of the conductive layer 32 is, for example, 10 to 1000 μm. Such a conductive layer 32 can be formed on the substrate 31 using a plating method, a chemical vapor deposition method, or a sputtering method. The adhesive layer 11 adheres to a conductive layer 32 side of the conduction substrate 30. The adhesive layer 11 and the conductive layer 32 are electrically connected to each other. As shown in FIG. 2, for example, the conduction substrate 30 of the present embodiment has an extension portion 30a which is exposed with extending than the adhesive layers 11 and 21 in the surface spreading direction thereof. In such a configuration, it is easy to realize an electrical connection between one terminal of a voltage applying device or a DC power supplying device and the conduction substrate 30 or the conductive layer 32, via the extension portion 30a. In addition, in the present embodiment, the conduction substrate 30 may be a conductive substrate instead of having the laminate structure including the substrate 31 and the conductive layer 32. Such a conduction substrate 30 is formed of, for example, metal or a conductive polymer. The thickness of the conduction substrate 30 having the structure described above is, for example, 10 to 1000 µm, preferably 30 to 500 µm, and more preferably 50 to 300 µm.

A separator (release liner) may be provided on the adhesive sheet X1. The separator is an element for protecting the adhesive layers 11 and 21 of the adhesive sheet X1 so as not to be exposed, and is peeled from the adhesive sheet X1 when the adhesive sheet X1 adheres to the adherend. A form in which two sheets of separator sandwiches the adhesive sheet X1 may be adopted and a form in which the adhesive sheet X1 is wound in a roll shape with the separator such that the adhesive sheet X1 and the separator are alternately arranged. Examples of the separator include a substrate including a release treatment layer, a low adhesion substrate formed of a fluoropolymer, and a low adhesion substrate formed of a nonpolar polymer. A surface of the separator may be subjected to a peelable treatment, an antifouling treatment, or an antistatic treatment. A thickness of the separator is, for example, 5 to 200 µm.

Regarding each adhesive face in the adhesive sheet X1, from the viewpoint of realizing a good adhesion force, the 180° peelable adhesive force (with respect to a SUS304 plate, tension rate 300 mm/min, and peeling temperature 23° C.) is set to 0.1 N/10 mm or higher. The 180° peelable adhesive force of the double-sided adhesive sheet can be measured according to JIS Z 0237, for example, as follows.

First, in the double-sided adhesive sheet with separators on both sides, one separator is peeled off, and then a polyethylene terephthalate (PET) film having a thickness of 50 µm is pasted on the exposed adhesive face. Therefore, the double-sided adhesive sheet is subjected to backing. Next, a test piece (width 10 mm×length 100 mm) is cut out from the double-sided adhesive sheet which was backed. Next, the other separator is peeled off from the test piece, and the test piece was attached to a stainless steel plate (SUS304) as an adherend. Thereafter, the test piece and the adherend are pressed by reciprocating a 2 kg roller one time. Then, after standing for 30 minutes, 180° peelable adhesive force (tension rate: 300 mm/min and peeling temperature 23° C.) is measured using a peeling tester (trade name "Angle variable peeling measuring machine YSP" manufactured by ASAHI SEIKO CO., LTD.).

In manufacturing of the adhesive sheet X1 having the configuration described above, for example, first, an adhesive composition (first composition) for forming the adhesive layer 11 and an adhesive composition (second composition) for forming the adhesive layer 21 are respectively produced. Next, the first composition is applied to the conductive layer 32 side of the conduction substrate 30, and dried. Accordingly, the adhesive layer 11 is formed. Next, the second composition is applied to a substrate 31 side of the conduction substrate 30, and dried. Accordingly, the adhesive layer 21 is formed. In this manner, for example, the adhesive sheet X1 can be manufactured.

Alternatively, the adhesive sheet X1 may be manufactured by a so-called transfer method. Specifically, first, the adhesive layers 11 and 21 are respectively formed on a separator (release liner). Regarding the adhesive layer 11, the first composition for forming the adhesive layer 11 is applied to a release treatment surface of a predetermined separator to form a coated film, and then the coated film is dried to form the adhesive layer 11. Regarding the adhesive layer 21, the second composition for forming the adhesive layer 21 is applied to a release treatment surface of a predetermined separator to form a coated film, and then the coated film is dried to form the adhesive layer 21. Next, the adhesive layer 11 with the separator is attached to the conductive layer 32 side of the conduction substrate 30. Next, the adhesive layer 21 with the separator is attached to the substrate 31 side of the conduction substrate 30. In this manner, for example, the adhesive sheet X1 can be manufactured.

Figure 3:
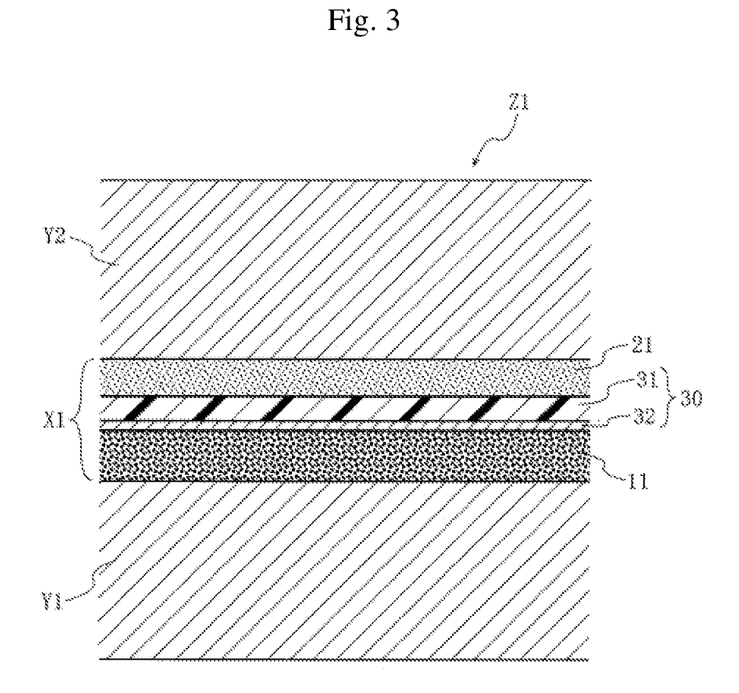
FIG. 3 is a sectional configuration view of a double-sided adhesive sheet joined body according to an embodiment of the present invention.

FIG. 3 is a sectional configuration view of a joined body Z1 as the double-sided adhesive sheet joined body according to an embodiment of the present invention. The joined body Z1 has a laminate structure including adherends Y1 and Y2 and the adhesive sheet X1 described above. The adherend Y1 is an adherend having conductivity. Examples of a constituent material of such a conductive adherend include aluminum, copper, iron, silver, and an alloy containing these. Meanwhile, the adherend Y2 may be a conductive adherend or may be a nonconductive adherend. Each of the adherends Y1 and Y2 is, for example, an adherend difficult to be elastically bent and deformed. Examples of the adherend difficult to be elastically bent and deformed include a rigid adherend, a brittle adherend, or an adherend prone to plastic deformation. The adhesive sheet X1 includes the adhesive layers 11 and 21 described above. The adhesive layer 11 adheres to the adherend Y1 and the adhesive layer 21 adheres to the adherend Y2. The joined body Z1 having such a structure is obtained by joining the adherend Y1 and the adherend Y2 to each other via the adhesive sheet X1 as the double-sided adhesive sheet.

In the joined body Z1 having the configuration, a voltage can be applied to the adhesive layer 11 of the adhesive sheet X1 via the adherend Y1 having conductivity and the conductive layer 32 of the conduction substrate 30. An application of a voltage to the adhesive layer 11 can be performed in a state where a pair of terminals of a voltage applying device or a DC power supplying device are electrically connected to the adherend Y1 and the conductive layer 32 of the conduction substrate 30. The application of the voltage is performed, for example, by bringing a cathode terminal of the voltage applying device into contact with the adherend Y1 and bringing an anode terminal into contact with the conductive layer 32. When the voltage is applied in this manner, a potential difference in a thickness direction of the adhesive layer 11 is generated, and in the electrolyte in the adhesive layer 11, an orientation variation or movement in a layer thickness direction occurs. Therefore, a composition of a surface (electrically peelable adhesive face) of the adhesive layer 11 changes. Accordingly, an adhesion force of the adhesive face with respect to the adherend Y1 and/or the conduction substrate 30 is lowered. In a case where the adhesive layer 11 contains the ionic liquid described above as an electrolyte, in cations and anions of the ionic liquid in the adhesive layer 11, the orientation variation of the movement in the layer thickness direction occurs. The cations move toward the cathode in which the potential is low and the anions move toward the anode in which the potential is high. In the ionic liquid, the cations tend to move faster with a larger diffusion coefficient than the anions. When a voltage is applied to the adhesive layer 11 containing the ionic liquid, change in composition (uneven distribution of cations) at the surface on the cathode side occurs prior to change in composition (uneven distribution of anions) at the surface on the anode side of the adhesive layer 11. For example, in the adhesive layer 11, the adhesion force with respect to the adherend Y1 is significantly lowered in advance. Since the adhesion force of the adhesive layer 11 or the adhesive face thereof tends to decrease as a voltage application time is longer, in a state where the adhesion force of the adhesive face with respect to the adherend Y1 and/or the conduction substrate 30 is sufficiently lowered, there is no need to perform the peeling operation that causes the bending deformation of the adherends Y1 and Y2 to occur when separating the adherends Y1 and Y2 from each other. Even when one or both of the adherends Y1 and Y2 is the adherend which is difficult to be elastically bent and deformed, it is possible to separate the adherends Y1 and Y2 in which a joined state was realized by the adhesive sheet X1 without requiring the peeling operation with respect to the adherends. In addition, regarding the adherends Y1 and Y2, separation is performed at an interface between the adherend Y1 and the adhesive layer 11 of the adhesive sheet X1 and then, the adhesive sheet X1 or the adhesive layer 21 is peeled off from the adherend Y2. Accordingly, the adherends Y1 and Y2 can be respectively recovered.

As described above, the adhesive sheet X1 is appropriate for efficiently performing the separation between adherends Y1 and Y2 including at least one adherend which is difficult to be elastically bent and deformed after the adherends Y1 and Y2 are joined to each other. The adhesive sheet X1 is, for example, appropriate for efficiently performing the separation between adherends Y1 and Y2 including at least one rigid adherend after the adherends Y1 and Y2 are joined to each other. In addition, the joined body Z1 is appropriate for efficiently performing the separation between the adherends Y1 and Y2, even in a case where at least one of the adherends Y1 and Y2 is an adherend which is difficult to be elastically bent and deformed. The joined body Z1 is appropriate for efficiently performing the separation between the adherends Y1 and Y2, even when at least one of the adherends Y1 and Y2 is, for example, a rigid adherend.

A voltage applied to the adhesive layer 11 is preferably 1 to 100 V. A lower limit of the voltage is more preferably 3 V and still more preferably 6 V. An upper limit of the voltage is more preferably 50 V, and still more preferably 30 V, and still further preferably 15 V. Such a configuration is preferable to efficiently perform the separation operation of the double-sided adhesive sheet joined body. For example, according to such a configuration, an easily accessible power supply such as a battery can be used as a power supply of the voltage applying device. In addition, the time for applying a voltage to the adhesive layer 11 is preferably 60 seconds or shorter, more preferably 40 seconds or shorter, and still more preferably 20 seconds or shorter. Such a configuration is preferable to achieve efficiency of the separation operation of the joined body. A configurations relating to these preferred applied voltages and preferred application time are the same in the embodiments described later.

Figure 4:
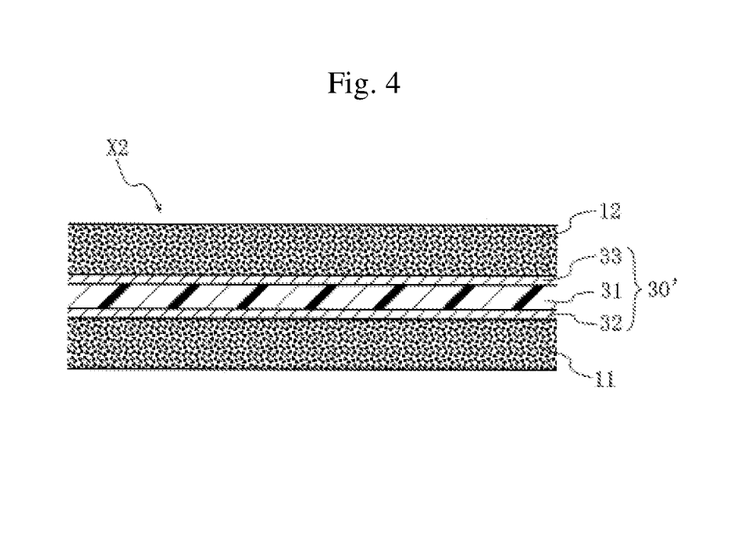
FIG. 4 is a sectional configuration view of a double-sided adhesive sheet according to another embodiment of the present invention.

FIG. 4 is a sectional configuration view of an adhesive sheet X2 as the double-sided adhesive sheet according to another embodiment of the present invention. The adhesive sheet X2 is an electrically-peelable double-sided adhesive sheet and has a laminate structure including the adhesive layer 11, the adhesive layer 12, and a conduction substrate 30' therebetween. The adhesive sheet X2 has the same configuration as the adhesive sheet X1 described above, except that the adhesive sheet X2 includes the adhesive layer 12 in place of the adhesive layer 21 and includes the conduction substrate 30' in place of the conduction substrate 30.

The adhesive layer 12 is an electrically-peelable adhesive layer, and contains a polymer as the adhesive and an electrolyte. In addition, the adhesive layer 12 forms an adhesive layer on one surface of the adhesive sheet X2. The configuration of such an adhesive layer 12 is the same as the configuration described above relating to the adhesive layer 11 of the adhesive sheet X1. Regarding a composition of a constituent material, the adhesive layer 11 and the adhesive layer 12 may be the same as or different from each other.

Figure 5:
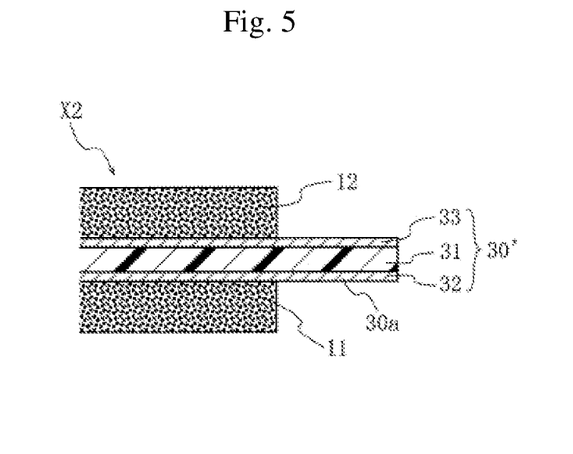
FIG. 5 is a sectional view illustrating an example of an end portion of the double-sided adhesive sheet shown in FIG. 4.

In this embodiment, the conduction substrate 30' has a laminate structure including the substrate 31, the conductive layer 32, and a conductive layer 33. Such a conduction substrate 30' has the same configuration as the conduction substrate 30 described above of the adhesive sheet X1 except that the conduction substrate 30' further includes the conductive layer 33. The conductive layer 33 is a layer having conductivity, and is formed of, for example, metal of a conductive polymer. A thickness of the conductive layer 33 is, for example, 10 to 1000 µm. Such a conductive layer 33 can be formed on the substrate 31 using a plating method, a chemical vapor deposition method, or a sputtering method. In the adhesive sheet X2, the adhesive layer 11 adheres to the conductive layer 32 side of the conduction substrate 30' to electrically connect the adhesive layer 11 and the conductive layer 32, and the adhesive layer 12 adheres to the conductive layer 33 side of the conduction substrate 30' to electrically connect the adhesive layer 12 and the conductive layer 33. In the present embodiment, for example, a configuration in which the conductive layer 32 and the conductive layer 33 are electrically connected via a conductive via (not shown) penetrating the substrate 31 may be adopted. In addition, as shown in FIG. 5, for example, the conduction substrate 30' of the present embodiment has an extension portion 30a exposed with extending than the adhesive layers 11 and 12 in the surface-spreading direction thereof. In such a configuration, it is easy to realize an electrical connection between one terminal of a voltage applying device or a DC power supplying device and the conduction substrate 30' or the conductive layers 32 and 33, via the extension portion 30a. In the present embodiment, the conduction substrate 30' may be a conductive substrate instead of having a laminate structure including the substrate 31 and the conductive layers 32 and 33. Such a conduction substrate 30' is formed of, for example, metal or a conductive polymer. A thickness of the conduction substrate 30' having the above configuration is, for example, 10 to 1000 µm, preferably 30 to 500 µm, and more preferably 50 to 300 µm.

In the same manner as described above relating to the adhesive sheet X1, a separator (release liner) may be provided on the adhesive sheet X2. In the same manner as described above relating to the adhesive sheet X1, regarding each adhesive face in the adhesive sheet X2, from the viewpoint of realizing a good adhesion force, the 180° peelable adhesive force (with respect to a SUS304 plate, tension rate 300 mm/min, and peeling temperature 23° C.) is preferably set to 0.1 N/10 mm or higher.

In manufacturing of the adhesive sheet X2 having the configuration described above, for example, first, the adhesive composition (first composition) for forming the adhesive layer 11 and the adhesive composition (second composition) for forming the adhesive layer 12 are respectively produced. Next, the first composition is applied to a conductive layer 32 side of the conduction substrate 30', and dried. Accordingly, the adhesive layer 11 is formed. Next, the second composition is applied to the conductive layer 33 side of the conduction substrate 30', and dried. Accordingly, the adhesive layer 12 is formed. In this manner, for example, the adhesive sheet X2 can be manufactured.

Alternatively, the adhesive sheet X2 may be manufactured by a so-called transfer method. Specifically, first, the adhesive layers 11 and 12 are respectively formed on a separator (release liner). Regarding the adhesive layer 11, the first composition for forming the adhesive layer 11 is applied to a release treatment surface of a predetermined separator to form a coated film, and then the coated film is dried to form the adhesive layer 11. Regarding the adhesive layer 12, the second composition for forming the adhesive layer 12 is applied to a release treatment surface of a predetermined separator to form a coated film, and then the coated film is dried to form the adhesive layer 12. Next, the adhesive layer 11 with the separator is attached to the conductive layer 32 side of the conduction substrate 30'. Next, the adhesive layer 12 with the separator is attached to a conductive layer 33 side of the conduction substrate 30'. In this manner, for example, the adhesive sheet X2 can be manufactured.

Figure 6:
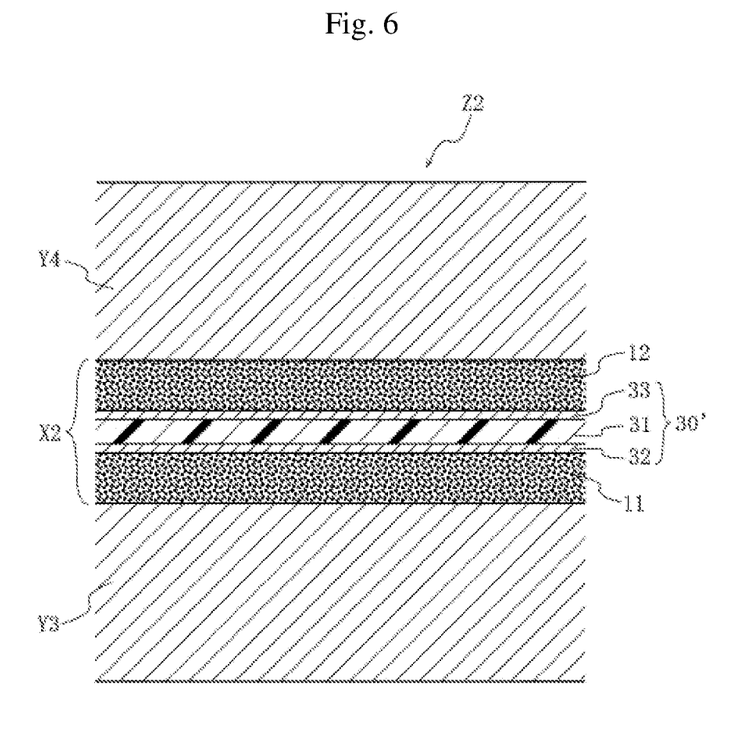
FIG. 6 is a sectional configuration view of a double-sided adhesive sheet joined body according to another embodiment of the present invention.

FIG. 6 is a sectional configuration view of a joined body Z2 as a double-sided adhesive sheet joined body according to another embodiment of the present invention. The joined body Z2 has a laminate structure including adherends Y3 and Y4 and the adhesive sheet X2 described above. The adherends Y3 and Y4 are adherends having conductivity. Examples of a constituent material of such a conductive adherend include aluminum, copper, iron, silver, and an alloy containing these. The adherends Y3 and Y4 are, for example, the adherend difficult to be elastically bent and deformed such as a rigid adherend, a brittle adherend, or an adherend prone to plastic deformation. The adhesive sheet X2 includes the adhesive layers 11 and 12 described above. The adhesive layer 11 adheres to the adherend Y3 and the adhesive layer 12 adheres to the adherend Y4. The joined body Z2 having such a structure is obtained by joining the adherend Y3 and the adherend Y4 to each other via the adhesive sheet X2 as the double-sided adhesive sheet.

In the joined body Z2 having the configuration, a voltage can be applied to the adhesive layer 11 of the adhesive sheet X2 via the adherend Y3 having conductivity and the conductive layer 32 of the conduction substrate 30'. An application of a voltage to the adhesive layer 11 can be performed in a state where a pair of terminals of a voltage applying device are electrically connected to the adherend Y3 and the conductive layer 32 of the conduction substrate 30'. The application of the voltage is performed, for example, by bringing a cathode terminal of the voltage applying device into contact with the adherend Y3 and bringing an anode terminal into contact with the conductive layer 32. When the voltage is applied in this manner, a potential difference in the thickness direction of the adhesive layer 11 is generated, and in the electrolyte in the adhesive layer 11, an orientation variation or movement in the layer thickness direction occurs. Therefore, a composition of a surface (electrically peelable adhesive face) of the adhesive layer 11 changes. Accordingly, an adhesion force of the adhesive face with respect to the adherend Y3 and/or the conduction substrate 30' is lowered. In a case where the adhesive layer 11 contains the ionic liquid described above as an electrolyte, in cations and anions of the ionic liquid in the adhesive layer 11, the orientation variation of the movement in the layer thickness direction occurs. The cations move toward the cathode in which the potential is low and the anions move toward the anode in which the potential is high. In the ionic liquid as described above, the cations tend to move faster with a larger diffusion coefficient than the anions. When a voltage is applied to the adhesive layer 11 containing the ionic liquid, change in composition (uneven distribution of cations) at the surface on the cathode side of the adhesive layer 11 occurs prior to change in composition (uneven distribution of anions) at the surface on the anode side thereof. For example, in the adhesive layer 11, the adhesion force with respect to the adherend Y3 is significantly lowered in advance. Since the adhesion force of the adhesive layer 11 or the adhesive face thereof tends to decrease as a voltage application time is longer, in a state where the adhesion force of the adhesive face with respect to the adherend Y3 and/or conduction substrate 30' is sufficiently lowered, there is no need to perform the peeling operation that causes the bending deformation of the adherends Y3 and Y4 to occur when separating the adherends Y3 and Y4 from each other. Even when one or both of the adherends Y3 and Y4 are the adherend which is difficult to be elastically bent and deformed, it is possible to separate the adherends Y3 and Y4 in which a joined state was realized by the adhesive sheet X2 without requiring the peeling operation with respect to the adherend.

On the other hand, in the joined body Z2, a voltage can be applied to the adhesive layer 12 of the adhesive sheet X2 via the adherend Y4 having conductivity and the conductive layer 33 of the conduction substrate 30'. An application of a voltage to the adhesive layer 12 can be performed in a state where a pair of terminals of a voltage applying device are electrically connected to the adherend Y4 and the conductive layer 33 of the conduction substrate 30'. The application of the voltage is performed, for example, by bringing a cathode terminal of the voltage applying device into contact with the adherend Y4 and bringing an anode terminal into contact with the conductive layer 33. When the voltage is applied in this manner, a potential difference in a thickness direction of the adhesive layer 12 is generated, and in the electrolyte in the adhesive layer 12, an orientation variation or movement in a layer thickness direction occurs. Therefore, a composition of a surface (electrically peelable adhesive face) of the adhesive layer 12 changes. Accordingly, an adhesion force of the adhesive face with respect to the adherend Y4 and/or the conduction substrate 30' is lowered. In a case where the adhesive layer 12 contains an ionic liquid as an electrolyte, in cations and anions of the ionic liquid in the adhesive layer 12, the orientation variation or the movement in the layer thickness direction occurs. The cations move toward the cathode in which the potential is low and the anions move toward the anode in which the potential is high. In the ionic liquid as described above, the cations tend to move faster with a larger diffusion coefficient than the anions. When a voltage is applied to the adhesive layer 12 containing the ionic liquid, change in composition (uneven distribution of cations) at the surface on the cathode side of the adhesive layer 12 occurs prior to change in composition (uneven distribution of anions) at the surface on the anode side thereof. For example, in the adhesive layer 12, the adhesion force with respect to the adherend Y4 is significantly lowered in advance. Since the adhesion force of the adhesive layer 12 or adhesive face thereof tends to decrease as a voltage application time is longer, in a state where the adhesion force of the adhesive face with respect to the adherend Y4 and/or conduction substrate 30' is sufficiently lowered, there is no need to perform the peeling operation that causes the bending deformation of the adherends Y3 and Y4 to occur when separating the adherends Y3 and Y4 from each other. Even when one or both of the adherends Y3 and Y4 is the adherend which is difficult to be elastically bent and deformed, it is possible to separate the adherends Y3 and Y4 in which a joined state was realized by the adhesive sheet X2 without requiring the peeling operation with respect to the adherend.

In the adherends separating operation at the joined body Z2, the above-described voltage application to the adhesive layer 11 and 12 can be performed at the same time, in a state where the cathode terminal of the voltage applying device is electrically connected to the adherends Y3 and Y4 and the anode terminal is electrically connected to the conductive layers 32 and 33 of the conduction substrate 30'. In addition, in the adherends separating operation at the joined body Z2, the above-described voltage application to the adhesive layers 11 and 12 can be independently performed in a stepwise manner.

As described above, the adhesive sheet X2 is appropriate for efficiently performing the separation between adherends Y3 and Y4 including at least one adherend which is difficult to be elastically bent and deformed after the adherends Y3 and Y4 are joined to each other. The adhesive sheet X2 is, for example, appropriate for efficiently performing the separation between adherends Y3 and Y4 including at least one rigid adherend after the adherends Y3 and Y4 are joined to each other. In addition, the joined body Z2 is appropriate for efficiently performing the separation between the adherends Y3 and Y4, even in a case where at least one of the adherends Y3 and Y4 is an adherend which is difficult to be elastically bent and deformed. The joined body Z2 is appropriate for efficiently performing the separation between the adherends Y3 and Y4, even when at least one of the adherends Y3 and Y4 is, for example, a rigid adherend.

Figure 7:
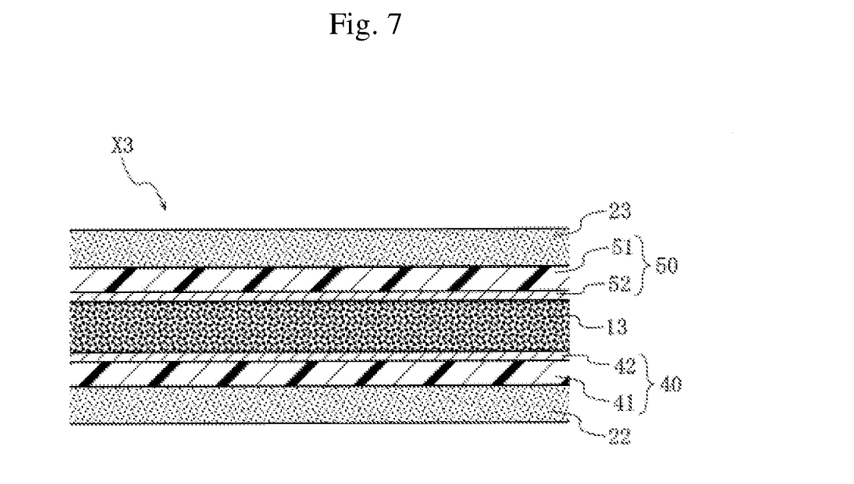
FIG. 7 is a sectional configuration view of a double-sided adhesive sheet according to still another embodiment of the present invention.

FIG. 7 is a sectional configuration view of an adhesive sheet X3 as a double-sided adhesive sheet according to still another embodiment of the present invention. The adhesive sheet X3 is an electrically-peelable double-sided adhesive sheet and has a laminate structure including the adhesive layer 13, an adhesive layer 22 and 23, and a conduction substrates 40 and 50.

The adhesive layer 13 is an electrically-peelable adhesive layer, and contains a polymer as an adhesive and an electrolyte. In addition, the adhesive layer 13 adheres to the conduction substrate 40 on one face side and adheres to the conduction substrate 50 on the other face side. The components contained in the adhesive layer 13 and the contents thereof are the same as those described above for the components contained in the adhesive layer 11 and the contents thereof. A thickness of the adhesive layer 13 is preferably 1 to 1000 μm from the viewpoint of realizing good adhesiveness in the adhesive layer 13 or the viewpoint of reducing the applied voltage for separating adherends from each other in the adhesive layer 13 as the electrolyte-containing adhesive layer. The lower limit of the thickness of the adhesive layer 13 is more preferably 3 μm, still more preferably 5 μm, and still further preferably 8 μm. The upper limit of the thickness of the adhesive layer 13 is more preferably 500 μm, still more preferably 100 μm, and still further preferably 30 μm.

The adhesive layer 22 contains a polymer for exhibiting adhesiveness in the adhesive layer 22. In addition, the adhesive layer 22 adheres to an adherend Y5 on one face side and adheres to the conduction substrate 40 on the other face side. The components contained in the adhesive layer 22 and the contents thereof are the same as those described above for the components contained in the adhesive layer 11 and the contents thereof except for the electrolyte. A thickness of the adhesive layer 22 is preferably 1 to 2000 μm from the viewpoint of realizing good adhesiveness in the adhesive layer 22. The lower limit of the thickness of the adhesive layer 22 is more preferably 3 μm, still more preferably 5 μm, and still further preferably 8 μm. The upper limit of the thickness of the adhesive layer 22 is more preferably 1000 μm, still more preferably 500 μm, and still further preferably 100 μm.

The adhesive layer 23 contains a polymer for exhibiting adhesiveness in the adhesive layer 23. In addition, the adhesive layer 23 adheres to an adherend Y6 on one face side and adheres to the conduction substrate 50 on the other face side. The components contained in the adhesive layer 23 and the contents thereof are the same as those described above for the components contained in the adhesive layer 11 and the contents thereof, except for the electrolyte. A thickness of the adhesive layer 23 is preferably 1 to 2000 μm from the viewpoint of realizing good adhesiveness in the adhesive layer 23. The lower limit of the thickness of the adhesive layer 23 is more preferably 3 μm, still more preferably 5 μm, and still further preferably 8 μm. The upper limit of the thickness of the adhesive layer 23 is more preferably 1000 μm, still more preferably 500 μm, and still further preferably 100 μm.

Figure 8:
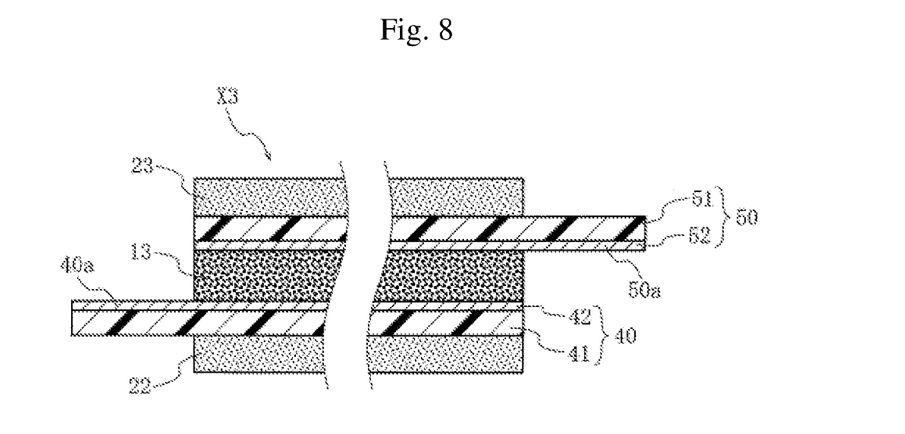
FIG. 8 is a sectional view illustrating an example of an end portion of the double-sided adhesive sheet shown in FIG. 7.

In the present embodiment, the conduction substrate 40 has a laminate structure including a substrate 41 and a conductive layer 42. The substrate 41 is a portion that functions as a support, and is, for example, a plastic substrate, a fiber based substrate, or a paper based substrate. The conductive layer 42 is a layer having conductivity, and is formed of, for example, metal or a conductive polymer. A thickness of the conductive layer 42 is, for example, 10 to 1000 μm. Such a conductive layer 42 can be formed on the substrate 41 using a plating method, a chemical vapor deposition method, or a sputtering method. The adhesive layer 13 adheres to a conductive layer 42 side of the conduction substrate 40. The adhesive layer 13 and the conductive layer 42 are electrically connected to each other. As shown in FIG. 8, for example, the conduction substrate 40 of the present embodiment has an extension portion 40a exposed with extending than the adhesive layers 13 and 22 in the surface spreading direction thereof. In such a configuration, it is easy to realize an electrical connection between one terminal of a voltage applying device or a DC power supplying device and the conduction substrate 40 or the conductive layer 42, via the extension portion 40a. In addition, in the present embodiment, the conduction substrate 40 may be a conductive substrate instead of having the laminate structure including the substrate 41 and the conductive layer 42. Such a conduction substrate 40 is formed of, for example, metal or a conductive polymer. The thickness of the conduction substrate 40 having the structure described above is, for example, 10 to 1000 μm, preferably 30 to 500 μm, and more preferably 50 to 300 μm.

In this embodiment, the conduction substrate 50 has a laminate structure including a substrate 51 and a conductive layer 52. The substrate 51 is a portion that functions as a support, and is, for example, a plastic substrate, a fiber based substrate, or a paper based substrate. The conductive layer 52 is a layer having conductivity, and is formed of, for example, metal or a conductive polymer. A thickness of the conductive layer 52 is, for example, 10 to 1000 μm. Such a conductive layer 52 can be formed on the substrate 51 using a plating method, a chemical vapor deposition method, or a sputtering method. The above described adhesive layer 13 adheres on a conductive layer 52 side of the conduction substrate 50. The adhesive layer 13 and the conductive layer 52 are electrically connected to each other. As shown in FIG. 8, for example, the conduction substrate 50 of the present embodiment has an extension portion 50a exposed with extending than the adhesive layers 13 and 23 in the surface spreading direction thereof. In such a configuration, it is easy to realize an electrical connection between one terminal of a voltage applying device and the conduction substrate 50 or the conductive layer 52, via the extension portion 50a. Then, an extending direction of the extension portion 50a from the adhesive layers 13 and 23 and an extending direction of the above described extension portion 40a from the adhesive layers 13 and 22 are different from each other, and in the present embodiment, are opposite directions. According to such a configuration, the voltage application to the adhesive sheet X3 or the adhesive layer 13 by the voltage applying device is appropriately and easily performed while avoiding short circuit, for example, between the device terminals. In addition, in the present embodiment, the conduction substrate 50 may be a conductive substrate instead of having the laminate structure including the substrate 51 and the conductive layer 52. Such a conduction substrate 50 is formed of, for example, metal or a conductive polymer. The thickness of the conduction substrate 50 having the structure described above is, for example, 10 to 1000 μm, preferably 30 to 500 μm, and more preferably 50 to 300 μm.

In the same manner as described above relating to the adhesive sheet X1, a separator (release liner) may be provided on the adhesive sheet X3. In the same manner as described above relating to the adhesive sheet X1, regarding each adhesive face in the adhesive sheet X3, from the viewpoint of realizing a good adhesion force, the 180° peelable adhesive force (relative to the SUS304 plate, the tension rate of 300 mm/min, and the peeling temperature 23° C.) is preferably set to 0.1 N/10 mm or more.

In manufacturing of the adhesive sheet X3 having the configuration described above, for example, first, the adhesive composition (first composition) for forming the adhesive layer 13, the adhesive composition (second composition) for forming the adhesive layer 22, and an adhesive composition (third composition) for forming the adhesive layer 23 are respectively produced. Next, the second composition is applied to a substrate 41 side of the conduction substrate 40, and dried. Accordingly, the adhesive layer 22 is formed. Next, the third composition is applied to a substrate 51 side of the conduction substrate 50, and dried. Accordingly, the adhesive layer 23 is formed. Next, the first composition is applied to the conductive layer 42 side of the conduction substrate 40 with the adhesive layer 22, and then the conduction substrate 50 with the adhesive layer 23 is laminated on the first composition coated film such that the conductive layer 52 is in contact with the first composition coated film. Then, the first composition coated film is dried between the conduction substrates 40 and 50. In this manner, for example, the adhesive sheet X3 can be manufactured.

Alternatively, the adhesive sheet X3 may be manufactured by a so-called transfer method. Specifically, first, the adhesive layers 13, 22, and 23 are respectively formed on a separator (release liner). Regarding the adhesive layer 13, the first composition for forming the adhesive layer 13 is applied to a release treatment surface of a predetermined separator to form a coated film, and then the coated film is dried to form the adhesive layer 13. Regarding the adhesive layer 22, the second composition for forming the adhesive layer 22 is applied to a release treatment surface of a predetermined separator to form a coated film, and then the coated film is dried to form the adhesive layer 22. Regarding the adhesive layer 23, the third composition for forming the adhesive layer 23 is applied to a release treatment surface of a predetermined separator to form a coated film, and then the coated film is dried to form the adhesive layer 23. Next, one face of the adhesive layer 13 is attached to the conductive layer 42 side of the conduction substrate 40, and the other face of the adhesive layer 13 is attached to the conductive layer 52 side of the conduction substrate 50. Next, the adhesive layer 22 with the separator is attached to the substrate 41 side of the conduction substrate 40. Next, the adhesive layer 23 with the separator is attached to the substrate 51 side of the conduction substrate 50. In this manner, for example, the adhesive sheet X3 can be manufactured.

Figure 9:
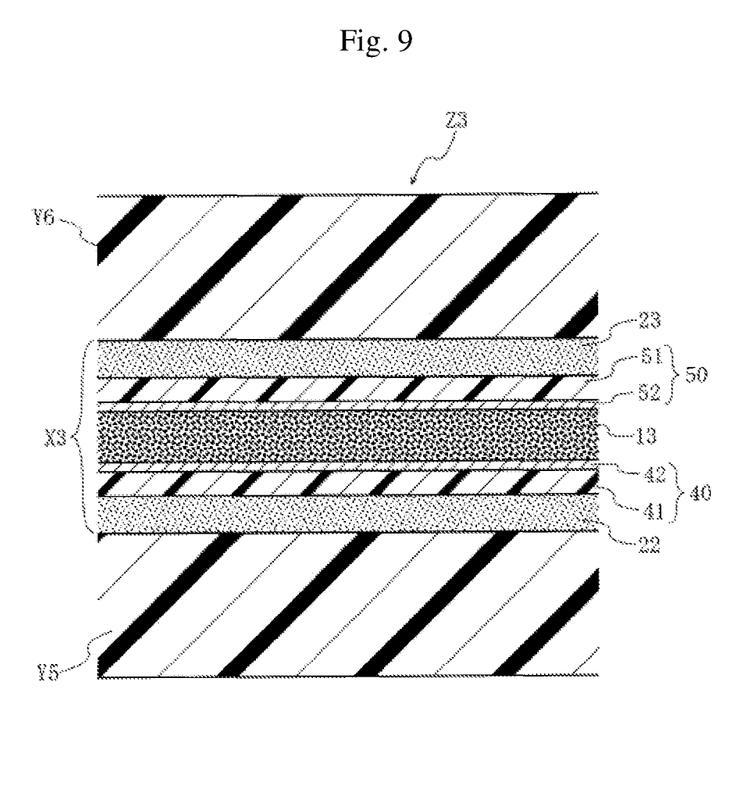
FIG. 9 is a sectional configuration view of a double-sided adhesive sheet joined body according to still another embodiment of the present invention.

FIG. 9 is a sectional configuration view of a joined body Z3 as a double-sided adhesive sheet joined body according to still another embodiment of the present invention. The joined body Z3 has a laminate structure including the adherends Y5 and Y6 and the above-described adhesive sheet X3. The adherends Y5 and Y6 may be a conductive adherend or may be a nonconductive adherend. The adherends Y5 and Y6 are, for example, the adherend difficult to be elastically bent and deformed such as a rigid adherend, a brittle adherend, or an adherend prone to plastic deformation. The adhesive sheet X3 includes the adhesive layers 22 and 23 described above. The adhesive layer 22 adheres to the adherend Y5 and the adhesive layer 23 adheres to the adherend Y6. The joined body Z3 having such a structure is obtained by joining the adherend Y5 and the adherend Y6 to each other via the adhesive sheet X3 as the double-sided adhesive sheet.

In the joined body Z3 having the configuration, a voltage can be applied to the adhesive layer 13 of the adhesive sheet X3 via the conductive layer 42 of the conduction substrate 40 having conductivity and the conductive layer 52 of the conduction substrate 50. An application of a voltage to the adhesive layer 13 can be performed in a state where a pair of terminals of a voltage applying device are electrically connected to the conductive layers 42 and 52. The application of the voltage is performed, for example, by bringing a cathode terminal of the voltage applying device into contact with the conductive layer 42 and bringing an anode terminal into contact with the conductive layer 52. When the voltage is applied in this manner, a potential difference in a thickness direction of the adhesive layer 13 is generated, and in the electrolyte in the adhesive layer 13, an orientation variation or movement in a layer thickness direction occurs. Therefore, a composition of a surface (electrically peelable adhesive face) of the adhesive layer 13 changes. Accordingly, an adhesion force of the adhesive face of the adhesive layer 13 is lowered. In a case where the adhesive layer 13 contains an ionic liquid as an electrolyte, in cations and anions of the ionic liquid in the adhesive layer 13, the orientation variation or the movement in the layer thickness direction occurs. The cations move toward the cathode in which the potential is low and the anions move toward the anode in which the potential is high. In the ionic liquid as described above, the cations tend to move faster with a larger diffusion coefficient than the anions. When a voltage is applied to the adhesive layer 13 containing the ionic liquid, change in composition (uneven distribution of cations) at the surface on the cathode side of the adhesive layer 13 occurs prior to change in composition (uneven distribution of anions) at the surface on the anode side thereof. For example, in the adhesive layer 13, the adhesion force with respect to the conductive layer 42 is significantly lowered in advance. Since the adhesion force of the adhesive layer 13 or adhesive face thereof tends to decrease as a voltage application time is longer, in a state where the adhesion force of the adhesive face is sufficiently lowered, there is no need to perform the peeling operation that causes the bending deformation of the adherends Y5 and Y6 to occur when separating the adherends Y5 and Y6 from each other. Even when one or both of the adherends Y5 and Y6 is the adherend which is difficult to be elastically bent and deformed, it is possible to separate the adherends Y5 and Y6 in which a joined state was realized by the adhesive sheet X3 without requiring the peeling operation with respect to the adherends. In addition, regarding the adherends Y5 and Y6, the separation is performed at an interface between the conductive layer 42 and the adhesive layer 13 of the adhesive sheet X3 and then, the adhesive layer 22 is peeled off from the adherend Y5 and the adhesive layer 23 is peeled off from the adherend Y6. Accordingly, the adherends Y5 and Y6 can be respectively recovered.

As described above, the adhesive sheet X3 is appropriate for efficiently performing the separation between adherends Y5 and Y6 including at least one adherend which is difficult to be elastically bent and deformed after the adherends Y5 and Y6 are joined to each other. The adhesive sheet X3 is, for example, appropriate for efficiently performing the separation between adherends Y5 and Y6 including at least one rigid adherend after the adherends Y5 and Y6 are joined to each other. In addition, the joined body Z3 is appropriate for efficiently performing the separation between the adherends Y5 and Y6, even in a case where at least one of the adherends Y5 and Y6 is an adherend which is difficult to be elastically bent and deformed. The joined body Z3 is appropriate for efficiently performing the separation between the adherends Y5 and Y6, even when at least one of the adherends Y5 and Y6 is, for example, a rigid adherend.

REFERENCE SIGNS LIST

X1, X2, and X3 Adhesive sheet
11, 12, 13, 21, 22, and 23 Adhesive layer
30, 30', 40, and 50 Conduction substrate
30a, 40a, and 50a Extension portion
31, 41, and 51 Substrate
32, 33, 42, and 52 Conductive layer
Y1, Y2, Y3, Y4, Y5, and Y6 Adherend
Z1, Z2, and Z3 Joined body

The invention claimed is:

1. A double-sided adhesive sheet having a laminate structure, comprising:
 a first adhesive layer;
 a second adhesive layer;
 a first conduction substrate and a second conduction substrate between the first adhesive layer and the second adhesive layer; and
 a third adhesive layer between the first conduction substrate and the second conduction substrate, and containing an electrolyte electrically connected to the first substrate and to the second conduction substrate,
 wherein
  the first conduction substrate comprises a first surface facing the first adhesive layer and a second surface facing the third adhesive layer,
  the second conduction substrate comprises a third surface facing the second adhesive layer and a fourth surface facing the third adhesive layer,
  the first conduction substrate includes a first extension portion protruding in a first direction away from an end of the first adhesive layer and a first end of the third adhesive layer such that the first surface of the first conduction substrate is exposed with respect to the first adhesive layer and the second surface of the first conduction substrate is exposed with respect to the third adhesive layer, and
  the second conduction substrate includes a second extension portion protruding in a second direction opposite to the first direction away from an end of the second adhesive layer and a second end of the third adhesive layer such that the third surface of the second conduction substrate is exposed with respect to the second adhesive layer and the fourth surface of the second conduction substrate is exposed with respect to the third adhesive layer.

2. The double-sided adhesive sheet according to claim 1, wherein a thickness of the third adhesive layer containing the electrolyte is 1 to 1000 μm.

3. The double-sided adhesive sheet according to claim 1, wherein the electrolyte is an ionic liquid.

4. The double-sided adhesive sheet according to claim 3, wherein the third adhesive layer containing the ionic liquid contains at least one selected from the group consisting of $(FSO_2)_2N^-$, $(CF_3SO_2)_2N^-$, $(CF_3CF_2SO_2)_2 N^-$, $(CF_3SO_2)_3C^-$, $CH_3COO^-$, $CF_3COO^-$, $CF_3CF_2CF_2COO^-$, $CF_3SO_3^-$, $CF_3(CF_2)_3SO_3^-$, $Br^-$, $AlCl_4^-$, $Al_2Cl_7^-$, $NO_3^-$, $BF_4^-$, $PF_6^-$, $AsF_6^-$, $SbF_6^-$, and $F(HF)_n^-$, as an anion of the ionic liquid.

5. The double-sided adhesive sheet according to claim 3, wherein the third adhesive layer containing the ionic liquid contains at least one selected from the group consisting of an imidazolium-based cation, a pyridinium-based cation, a pyrrolidinium-based cation, and an ammonium-based cation, as a cation of the ionic liquid.

6. The double-sided adhesive sheet according to claim 1, wherein the third adhesive layer contains an acrylic polymer.

7. The double-sided adhesive sheet according to claim 6, wherein a content of the electrolyte in the third adhesive layer is 0.5 to 30 parts by mass with respect to 100 parts by mass of the acrylic polymer.

8. A method for joining/separating adherends, comprising:
 joining a first adherend and a second adherend to each other via the double-sided adhesive sheet according to claim 1;
 applying a voltage to the third adhesive layer so as to generate a potential difference in a thickness direction of the third adhesive layer; and
 separating the first and second adherends from each other.

9. A double-sided adhesive sheet joined body comprising:
 a double-sided adhesive sheet having a laminate structure, comprising:
  a first adhesive layer;
  a second adhesive layer;
  a first conduction substrate and a second conduction substrate between the first adhesive layer and the second adhesive layer; and
  a third adhesive layer between the first conduction substrate and the second conduction substrate, and containing an electrolyte electrically connected to the first conduction substrate and to the second conduction substrate,
 a first adherend to which the first adhesive layer adheres; and a second adherend to which the second adhesive layer adheres, wherein the first conduction substrate comprises a first surface facing the first adhesive layer and a second surface facing the third adhesive layer, the second conduction substrate comprises a third surface facing the second adhesive layer and a fourth surface facing the third adhesive layer, the first conduction substrate includes a first extension portion protruding in a first direction away from an end of the first adhesive layer and a first end of the third adhesive layer such that the first surface of the first conduction substrate is exposed with respect to the first adhesive layer and the second surface of the first conduction substrate is exposed with respect to the third adhesive layer, and the second conduction substrate includes a second extension portion protruding in a second direction opposite to the first direction away from an end of the second adhesive layer and a second end of the third adhesive layer such that the third surface of the second conduction substrate is exposed with respect to the second adhesive layer and the fourth surface of the second conduction substrate is exposed with respect to the third adhesive layer.

10. The double-sided adhesive sheet joined body according to claim 9, wherein the electrolyte is an ionic liquid.

* * * * *